United States Patent [19]

Chandra et al.

[11] Patent Number: 4,644,493

[45] Date of Patent: Feb. 17, 1987

[54] IMPLEMENTING A SHARED HIGHER LEVEL OF PRIVILEGE ON PERSONAL COMPUTERS FOR COPY PROTECTION OF SOFTWARE

[75] Inventors: Akhileshwari N. Chandra, Mahopac; Liam D. Comerford, Carmel; Steve R. White, New York, all of N.Y.

[73] Assignee: International Business Machines Corporation, Armonk, N.Y.

[21] Appl. No.: 651,184

[22] Filed: Sep. 14, 1984

[51] Int. Cl.$^4$ .............................................. G06F 9/00
[52] U.S. Cl. ....................................... 364/900; 380/22
[58] Field of Search ............................... 364/200, 900; 178/22.09

[56] References Cited

U.S. PATENT DOCUMENTS

| | | | |
|---|---|---|---|
| 4,168,396 | 9/1979 | Best | 364/900 |
| 4,246,638 | 1/1981 | Thomas | 364/200 |
| 4,465,901 | 8/1984 | Best | 364/200 |
| 4,558,176 | 12/1985 | Arnold et al. | 364/900 |
| 4,573,119 | 2/1986 | Westheimer et al. | 364/200 |
| 4,577,289 | 3/1986 | Comerford et al. | 364/900 |

Primary Examiner—Thomas M. Heckler
Assistant Examiner—John G. Mills
Attorney, Agent, or Firm—Jack M. Arnold

[57] ABSTRACT

Method and apparatus which restricts software, distributed on magnetic media, to use on a single computing machine. The original medium is functionally uncopyable, until it is modified by the execution of a program stored in a tamper proof co-processor which forms a part of the computing machine. The modified software on the original medium may then be copied, but the copy is operable only on the computing machine containing the co-processor that performed the modification.

8 Claims, 22 Drawing Figures

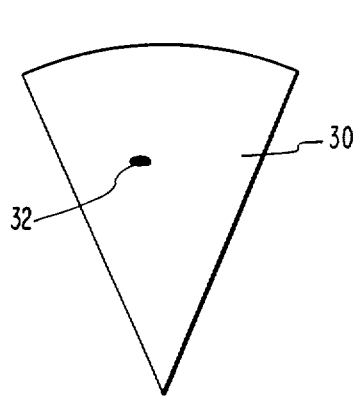
FIG. 2.0
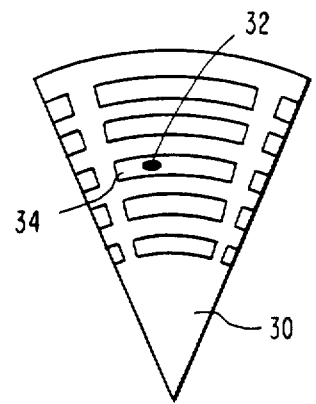
FIG. 2.1
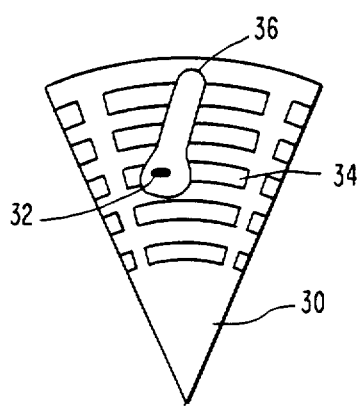
FIG. 2.2
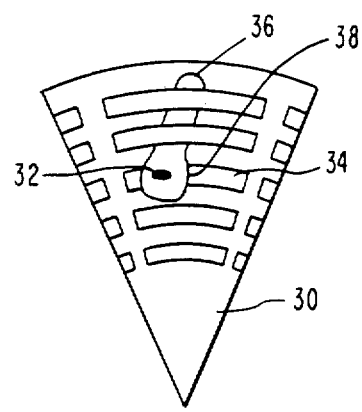
FIG. 2.3

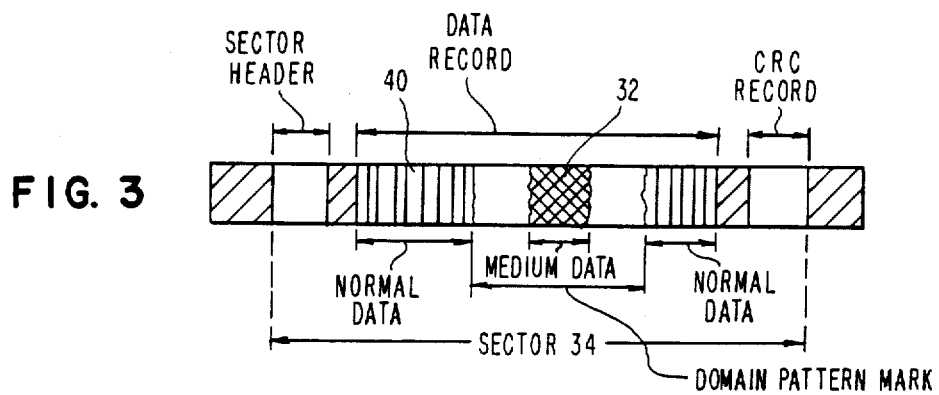
FIG. 3
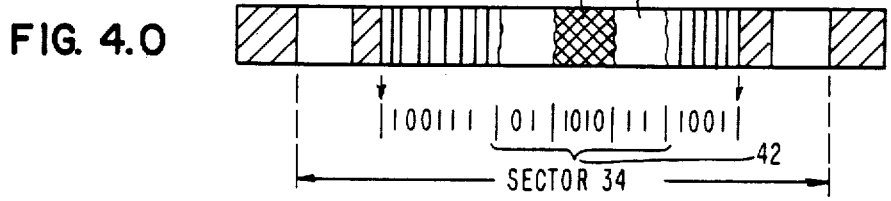
FIG. 4.0
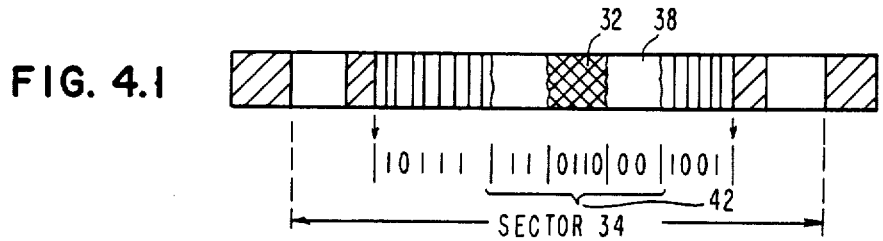
FIG. 4.1
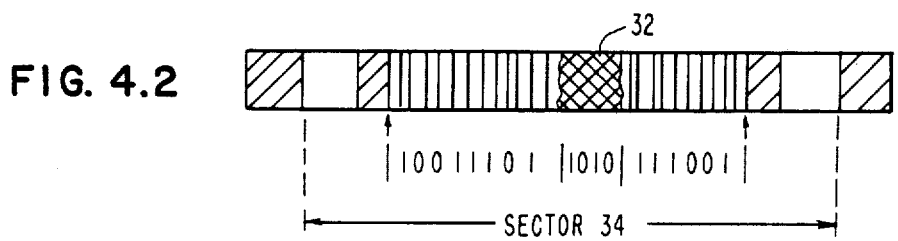
FIG. 4.2
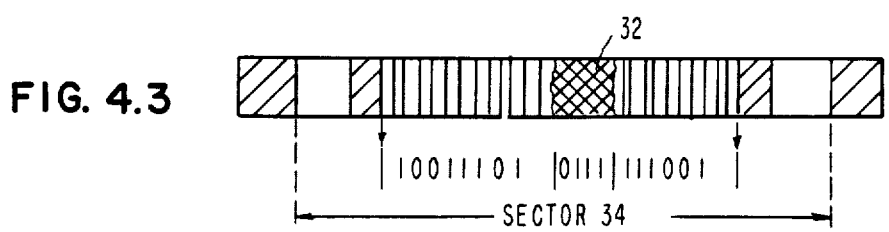
FIG. 4.3

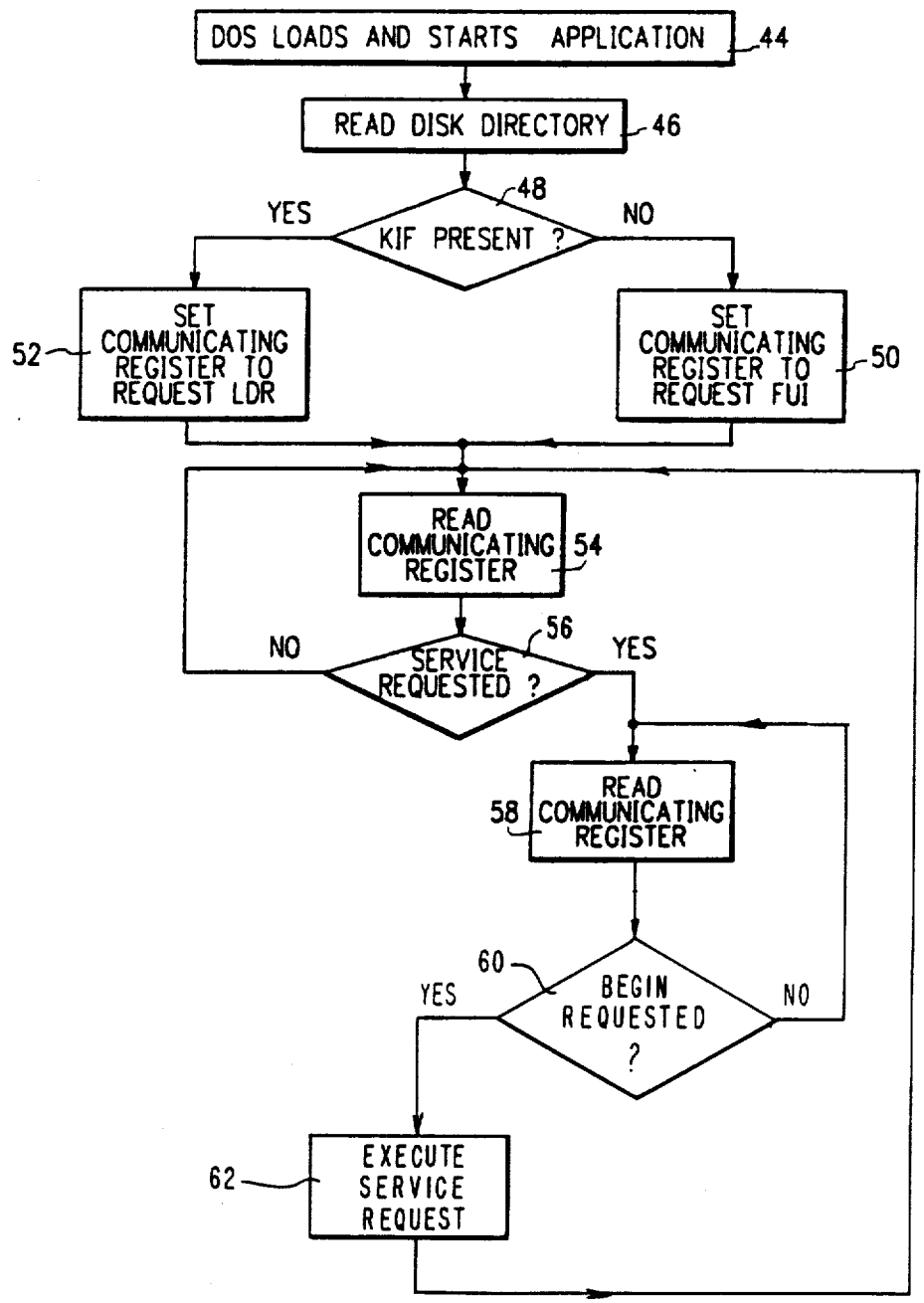

MONITOR SOFTWARE EXECUTING
IN SUPPORT HARDWARE

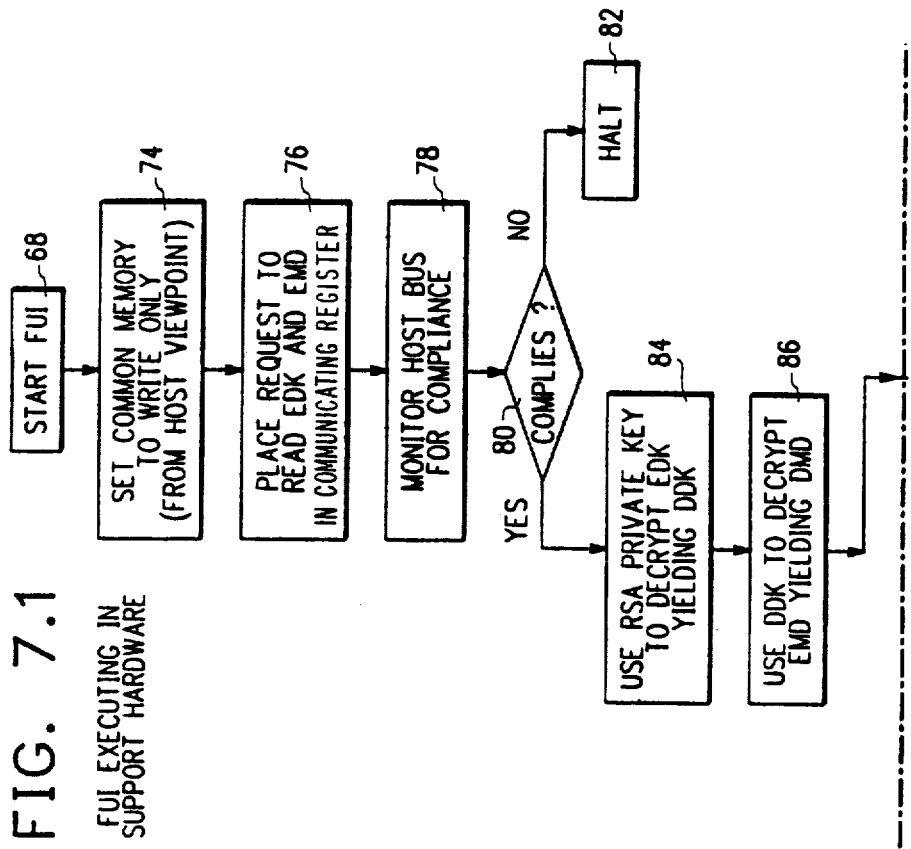

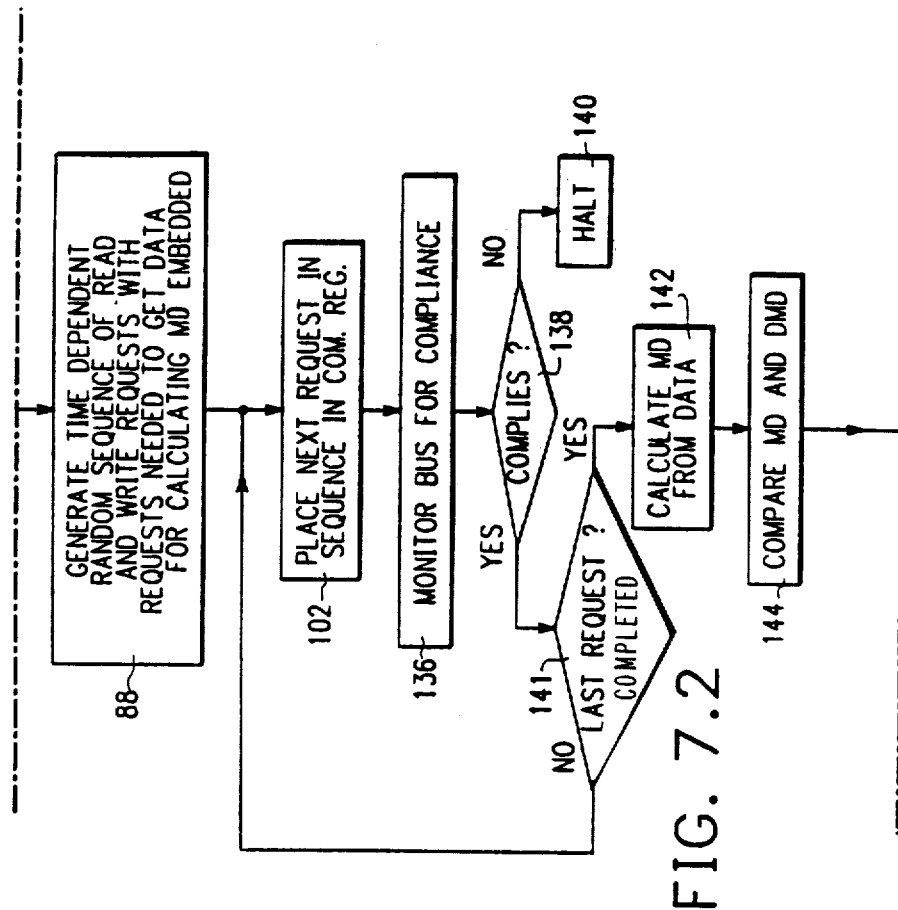
FIG. 7.2

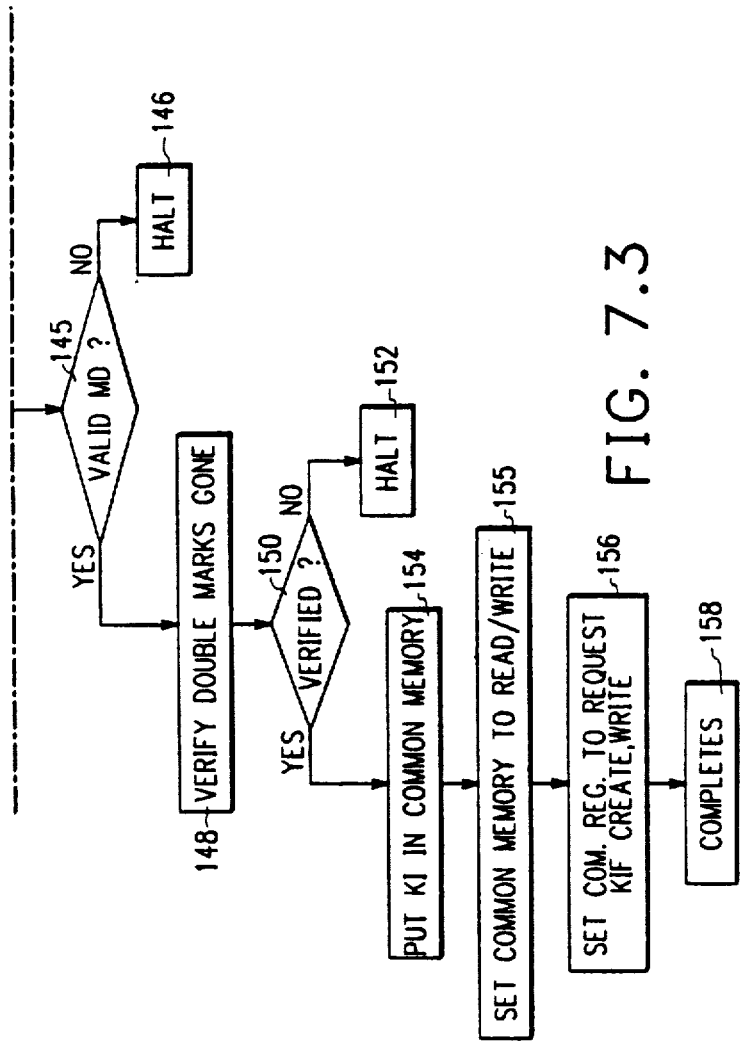
FIG. 7.3

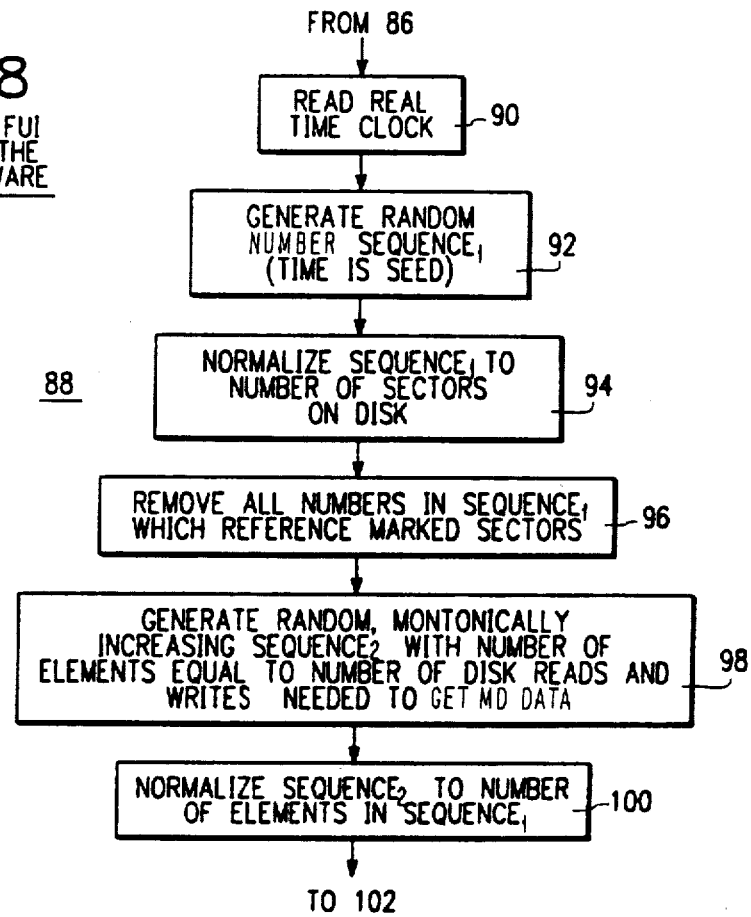

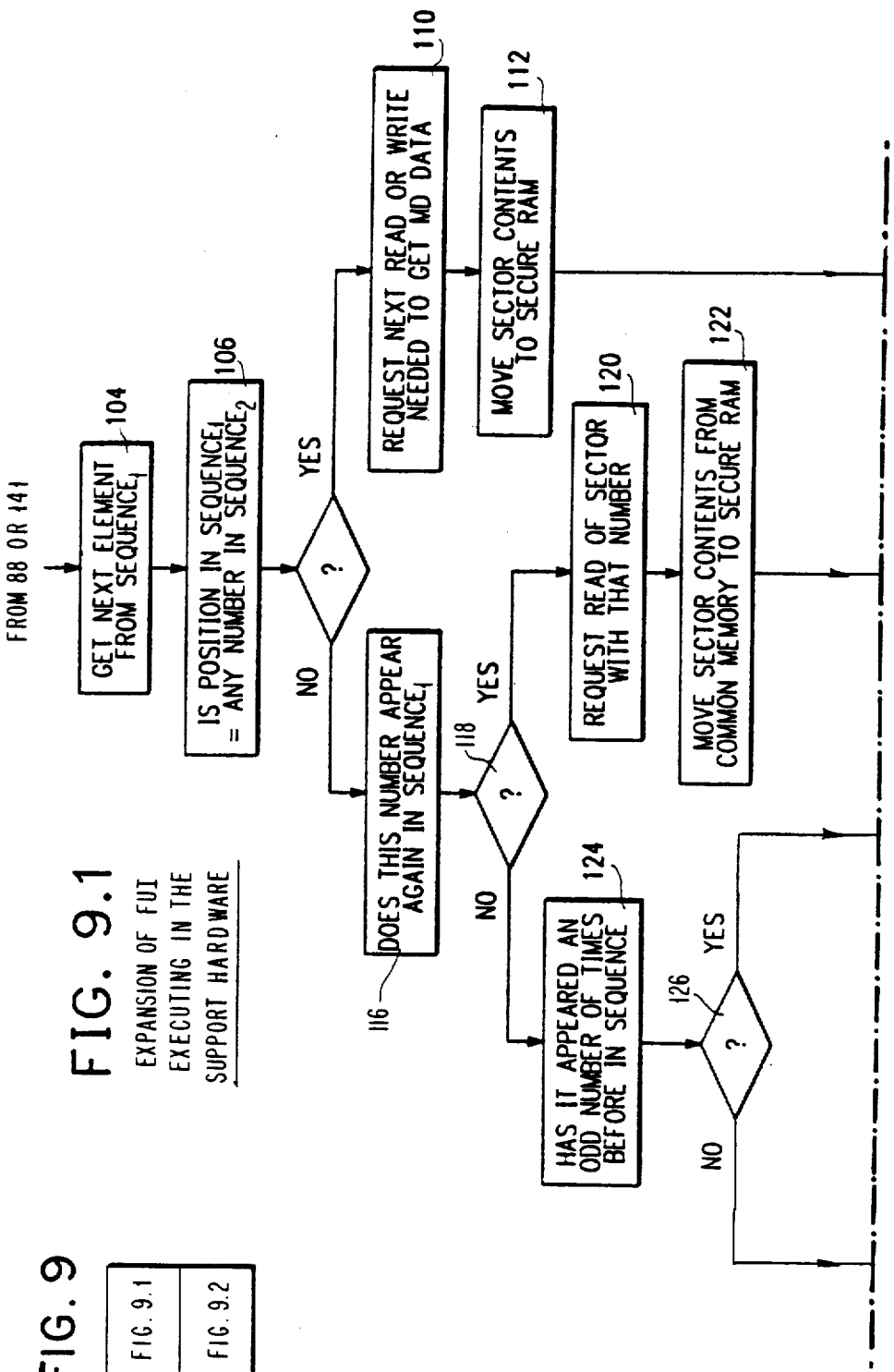

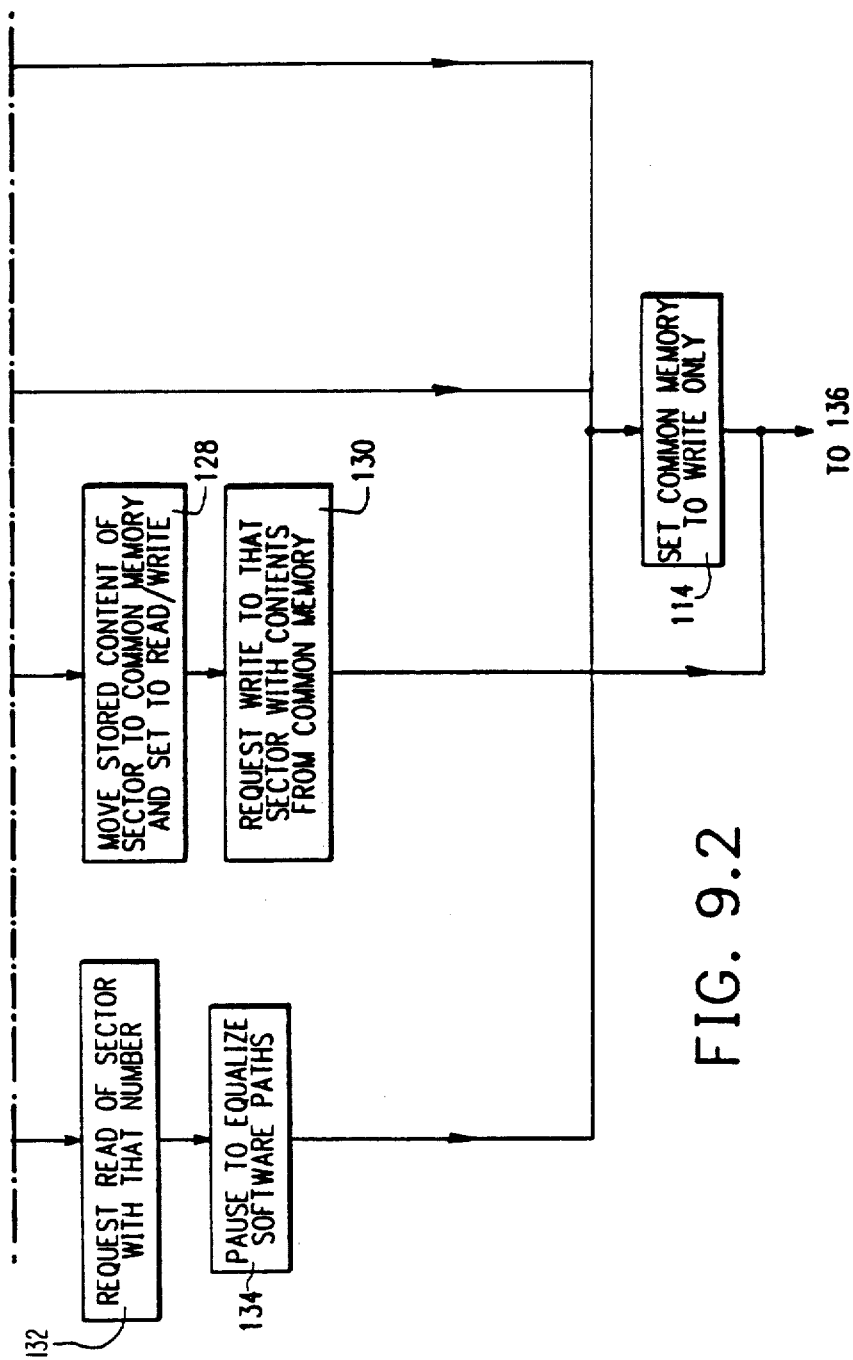
FIG. 9.2

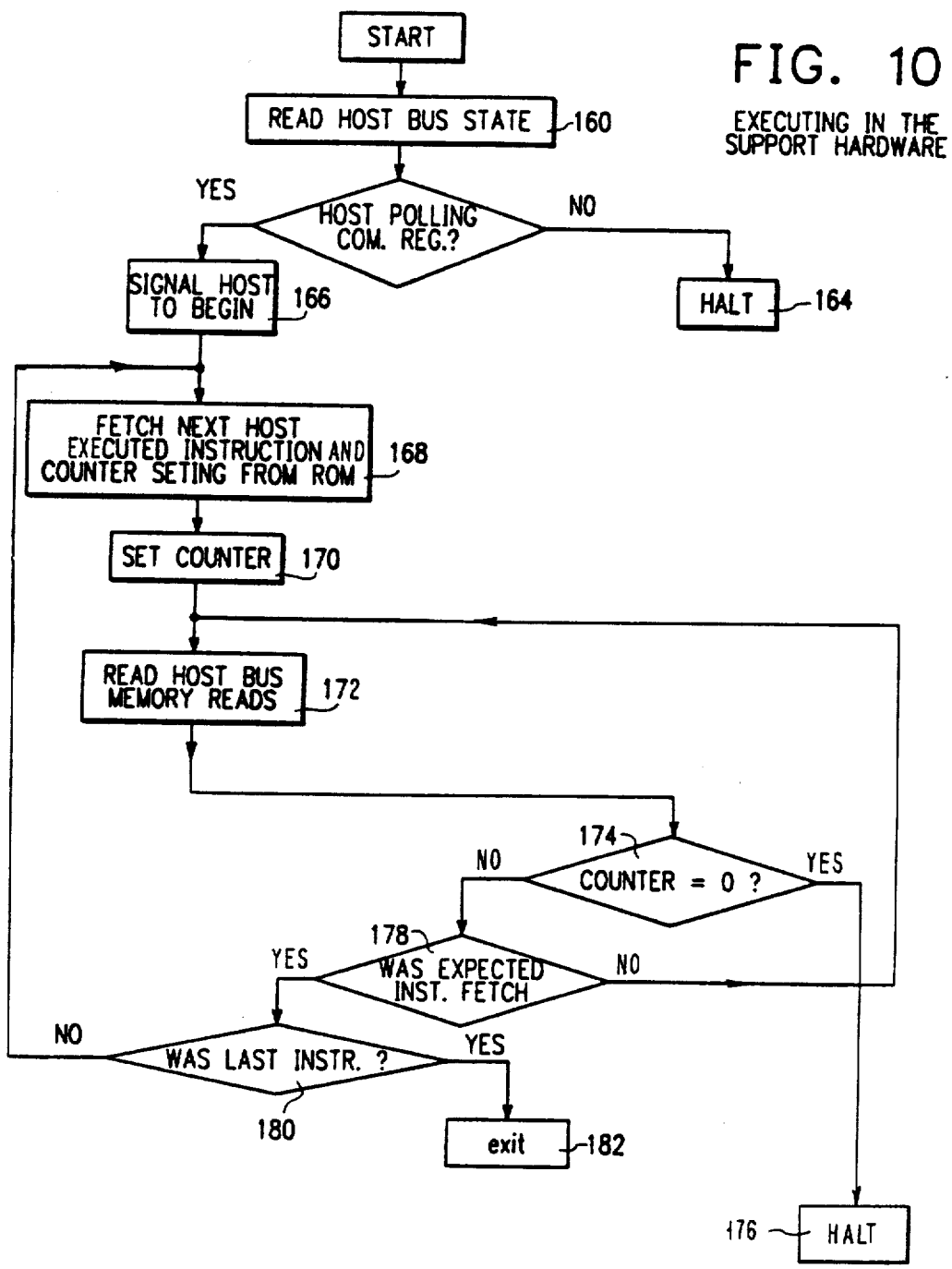

4,644,493

IMPLEMENTING A SHARED HIGHER LEVEL OF PRIVILEGE ON PERSONAL COMPUTERS FOR COPY PROTECTION OF SOFTWARE

DESCRIPTION

1. Technical Field

The invention is in the field of data processing, and specifically is directed to a software copy protection mechanism. In particular, a mechanism is provided which restricts software, distributed on disks or other magnetic medium, to use on a single computing machine, while allowing the creation of "backup" copies without compromising the protection.

2. Background Art

Copy-protection mechanisms are utilized to inhibit software piracy, which is the creation of unauthorized copies of commercial software. As the market for personal computers, home computers, work stations and intelligent products grows, piracy increasingly becomes a problem. The purpose of a copy-protection mechanism is to deter piracy by making copying of software as difficult as possible. Two basic classes of copy protection mechanisms have evolved to deter piracy, namely, software-based and hardware-key.

Software-based methods encode information on a disk so that conventional copying facilities available in most operating systems cannot accurately copy the information to another disk. The program on the disk checks for this encoded information, and fails to function unless it is there. Copying programs are now commercially available which can successfully copy most disks protected in this manner.

Hardware-key methods rely on the existence of information known as the "key", available to the program, but resident in the system hardware rather than on changeable magnetic medium like the disk. The program checks for the "key" information, and fails to function if the key is not found. Hardware duplication facilities are not commonly found in personal computers, while disk duplication facilities are. This makes hardware keys more costly to duplicate than software, so these methods can be more effective than software-based methods in detering piracy.

One proposed hardware-key method requires that the computer manufacturer install a hardware serial number in each machine as the hardware-key. This method requires every piece of software to be customized to a particular machine. This limits the availability and the interchangeability of software. A second method, currently in use, requires the software user to buy a special piece of hardware with each software product. This piece of hardware provides the key, and it has to be attached to the machine whenever the corresponding software is run, which makes the method unattractive.

In a large part each of the above protection methods is vulnerable to copying of a binary image of the running application from the system working memory, after such key checks have been made.

A number of patents have issued directed to software copy-protection mechanisms, each having certain advantages and disadvantages. Two such patents, U.S. Pat. No. 4,246,638 to Thomas and U.S. Pat. No. 4,168,396 to Best provide a protection mechanism by means which are essentially similar to each other. In both instances, the software package which is to be run on some particular personal computer is customized by the manufacturer to be compatible with the decryption keys and systems built into that particular computer. This is extremely cumbersome and places a large burden on users and vendors alike. The software used in the operation of the apparatus described in these patents causes no changes in structure to take place either in the user's computer or in the distribution disk.

U.S. Pat. No. 4,238,854 to Ehrsam et al addresses itself to a different problem, namely a means by which an encryption/decryption engine may be integrated into a multi-user mainframe computer system to protect a user's files from access by other users. It does not address itself either to the implementation of a distribution channel between software vendors and users of personal computers or to the execution environment for such protected software. It assumes that an operating system or hardware mechanism for provision of levels of privilege already exist in the machine in which this engine is to be installed. This is not the common case in personal computers.

U.S. Pat. No. 3,996,449 to Attanasio et al addresses itself to a problem faced by the operators of large mainframe computers. This problem is "penetration of security" meaning "a successful subversion of the file management component to change the backup copy of the operating system" or "counterfeiting the computer manufacturer's packing and delivery procedure" (for software). Such subversion or counterfeiting is accomplished by a third party who seeks to gain access to confidential files, payroll programs, or other potentially lucrative information or processors by means of features one has installed in the operating system.

U.S. patent application Ser. No. 06-567,294 entitled, "A Hardware Key-on-Disk System for Copy-Protecting Magnetic Storage Media", filed Dec. 30, 1983, which application is assigned to the assignee of the subject invention, incorporates the best features of both software based and hardware key methods. A hardware key is encoded directly onto a magnetic medium such as a floppy disk. This key consists of indicia in at least one subsection of at least one section of the disk that are not modifiable by the conventional medium write process. The data read from a section containing indicia differs in a predictable way from the data written to that section. The disk can be authenticated as the original disk by comparing a read-following-write with the expected results of such an operation. The software functions only in the presence of this key, as the key indicates the original medium is present. Software use is thus restricted to those users possessing an original distribution disk. Backup copies are not allowed by this system.

According to the subject invention, a method is set forth which restricts software, distributed on disks, to use on a single machine and allows backup copying. This mechanism involves making the distribution disks functionally uncopyable, until it is modified by the execution of a procedure which requires the cooperation of a co-processor. Upon modification, the software may be copied but can only be used on the machine containing the co-processor which participated in the modification procedure.

DISCLOSURE OF THE INVENTION

Method and apparatus are disclosed for the copy-protection of software, distributed on magnetic medium such as floppy disks, and used on a computing system. The apparatus which comprise the copy protection system consists of structures or marks imposed on the distribution magnetic medium, and a hardware subsystem installed in the intended recipient computer system. The hardware subsystem is a computing system the components of which include; a CPU, read only memory (ROM) which is logically inaccessible from the host system and containing software in the form of a monitor (which begins execution at power-on-time), random access memory (RAM) a portion of which is logically inaccessible from the host system and a portion of which may, under the control of the subsystem CPU be read from or written to by the host CPU, a memory in the form of "nonvolatile" RAM such as EEPROM, which is logically inaccessible from the host system, a timer and a real time clock which are logically inaccessible from the host system, a register which may, under the control of the subsystem CPU be read from or written to by the host CPU, and a set of bus receivers by means of which the subsystem CPU may "observe" the state of the host system bus. All of the above mentioned components of the hardware subsystem are logically accessible to the subsystem CPU, and are packaged in a manner which makes them physically inaccessible to the user of the host computing system.

The portion of the apparatus which consists of structures imposed on the distribution magnetic medium consists of two sorts of structures. One of these kinds is purely a pattern of magnetic domains on the medium which are not within the repertoire of domain patterns which can be created by the medium read/write apparatus of the target computer. The other kind of structure consists of regions on the medium on which boundaries between magnetic domains cannot be imposed by the medium read/write apparatus of the target computer. Very large magnetic domains are an example of the first kind of structure. Media voids are an example of the second kind of structure. The apparatus which consists of the two kinds of structures imposed on the distribution magnetic medium is so configured that the structures overlap each other.

While the medium read/write apparatus of the host system cannot create these structures, it can, through operations which can be performed by the read/write apparatus of the host system, detect and measure these structures. The operations required to measure the structures which won't support domain transitions are precisely the operations which will destroy the structure which consists of a domain pattern.

The destruction of one kind of structure by the write-read operation performed on the other kind of structure provides a means to the hardware subsystem to determine whether or not a particular piece of magnetic medium has been accessed by a subsystem of its own kind. The procedures performed by the subsystem allow the transfer of a certain critical piece of information from the medium only if this transfer has not ever been performed from this medium in the past. The procedure of transferring the information thus changes the structures on the medium so that no apparatus of this kind will perform the critical information transfer in the future. The hardware subsystem is supplied with a piece of information built in which is critical to the use of the information transferred from the magnetic medium, thus, the subsystem cannot be replicated by the user. The subsystem can "observe" the portion of the transfer process mediated by the host system. Thus, the transfer cannot be mimicked by software run on the host. The magnetic medium cannot be replicated by the user or used more than once for the transfer, thus, the medium cannot be copied in a form useful for the transfer operation.

The critical information which is transferred is a decryption key needed to run a portion of the application software on the subsystem. The decryption key is itself encrypted. The critical information built into the subsystem is the decryption key needed to restore the transferred decryption key to useful form, thus, the user cannot use this information without the cooperation of a subsystem of this kind.

Means are thus provided to bind a particular software distribution package, some part of which is in encrypted form, to a particular hardware subsystem and means are provided to make repeating this binding with the same particular software distribution package or replica thereof to another system, exceedingly difficult. Software distributed on magnetic medium is, by these means, protected from copying.

After such a binding has taken place, the support hardware may be called upon to execute some portion of the protected software. The support hardware which experienced the binding to that software package alone has the means to fill this call, as it alone has the key to decrypt the software. Both decryption and execution take place in memory which is logically and physically inaccessible to the user. Thus, the software is protected from copying by never being exposed to the user in a useable form.

After the transfer process is complete, when the support hardware is called upon to decrypt and execute some portion of the software, the apparatus comprised of structures on the distribution medium are not accessed. Since all other parts of the distribution medium are reproducible, the medium read/write apparatus of the host system can reproduce them. Thus, "backup" copies can be made after transfer but only the original system has the means to use the "backups".

BRIEF DESCRIPTION OF THE DRAWINGS

FIGS. 2.0–2.3 are sectional diagrams of a disk, illustrating how doubly marked regions are created thereon;

FIG. 3 is a section of a sector on a disk, illustrating the placement of doubly marked regions relative to a data record;

FIGS. 4.0–4.3 are sections of a sector on a disk, illustrating the four step process for reading and writing data from the sector to verify the existence of a doubly marked region on the disk;

FIG. 5 is a flow chart illustrating the support software which executes in the host computer;

FIGS. 7.1, 7.2 and 7.3, when viewed with FIG. 7.1 on top, FIG. 7.2 in the middle and FIG. 7.3 on the bottom, constitute a flow chart illustrating how the first-use-initialization (FUI) software which executes in the support hardware;

FIG. 8 is a detailed flow chart of flow chart element 88 in FIG. 7.2;

FIGS. 9.1 and 9.2 when viewed with 9.1 on the top and 9.2 on the bottom, constitute a detailed flow chart of element 102 in FIG. 7.2;

FIG. 10 is a detailed flow chart of the elements 78 and 136 in FIGS. 7.1 and 7.2, respectively.

BEST MODE OF CARRYING OUT THE INVENTION

Figure 1:
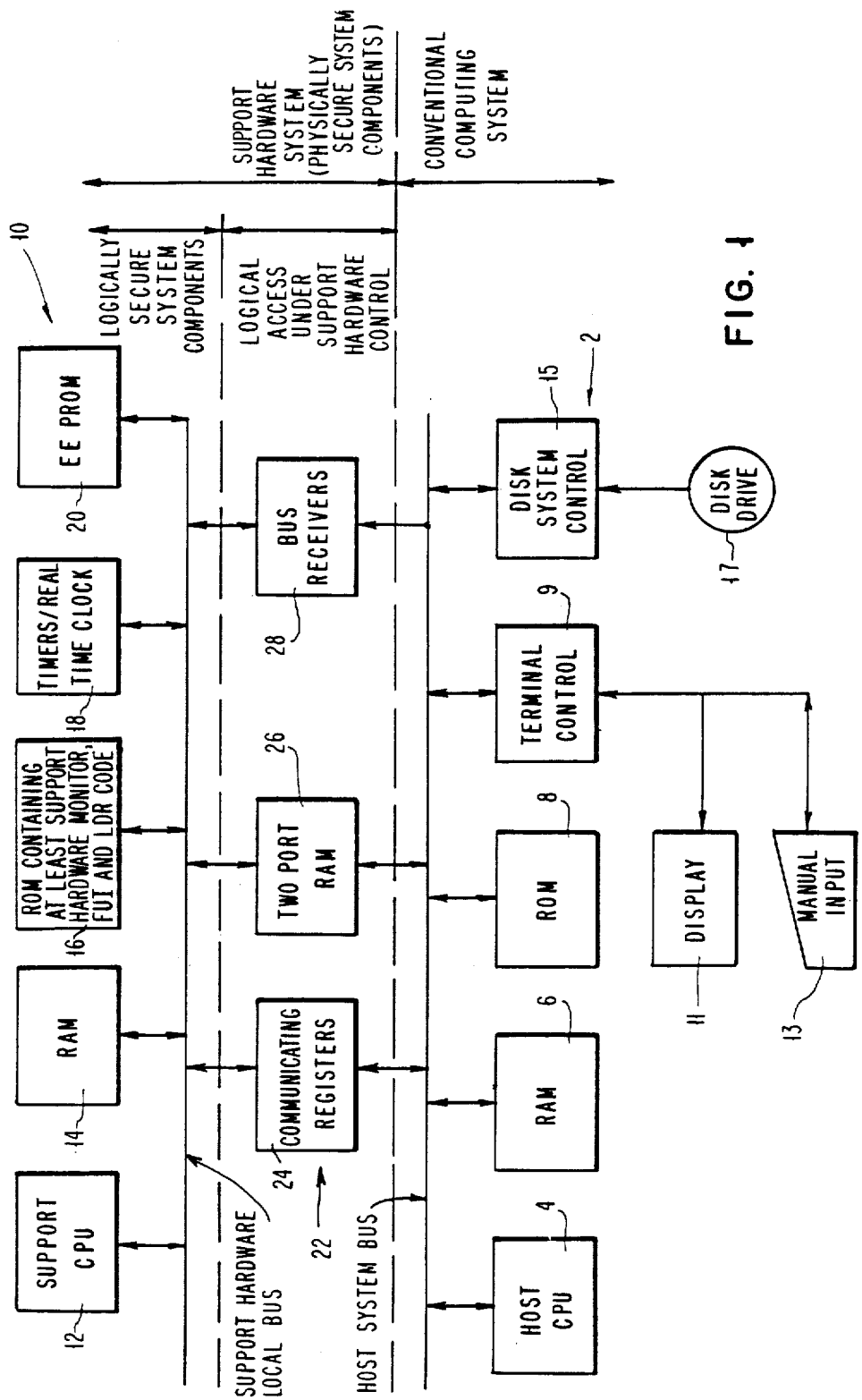
FIG. 1 is a block diagram representation of a computing system, including support hardware, according to the invention.

The name Personal Computer, or Single User System or Individual Work Station given to a class of small computers is misleading. Unless the user has also written all the programs including the operating system used in the computer, these machines are better titled Single Operator Systems. From the point of view of classical operating systems, this places the user/operator in a position of trust in which he has access to all the system code and system facilities. In common Single Operator Systems, this exposure of the system code and the system hardware facilities is an opportunity to replicate and distribute code, which on classical large computing systems, with separate operators and users, would be unavailable. The means by which this security is achieve on large systems is the implementation of a system in which users are given a privilege status level which is tested by the system to determine whether or not the user may execute certain instructions or access certain data for reading or modification.

It is the purpose of this invention to teach how a system utilizing privilege may be implemented on Single Operator Systems to the advantage of the hardware manufacturer, the software vendor, and the scrupulous Single Operator System user. It is called a "Shared Higher Level of Privilege System" because it can be viewed as providing each software vendor with an instanciation of a higher privilege level than the user, without giving any vendor access to other vendors' privileged information. By using this system, a portion of the hardware and software of the system is hidden in a co-processor subsystem (hereafter called the Support Hardware) which is installed in the Single Operator System (hereafter called the host) so that some portion of the vendor software can be made inaccessible to the user. In addition a method for transporting software on floppy disks or other magnetic medium is provided which allows the software vendor to hide some fraction of the software from the user in spite of the user being able to examine it with the resources available to him on the system. This is not to say that if the user makes a sufficient investment of time and money, by adding resources to his system beyond those needed for computing (e.g., logic analyzers and digital recorders), that he will still be unable to expose the code, rather that without such things, the resources of the Single Operator System which are available to the user are insufficient to obtain the code for piracy. Use of the resources of the Single Operator System are the overwhelmingly common means piracy, thus this system can dramatically reduce piracy in its common form and make piracy unprofitable due to its cost in time and tools in other cases.

For purposes of description, the host hardware is assumed to be an IBM Personal Computer (PC) the operation of which is described in the IBM Personal Computer Technical Reference Manual, 1981, and the host disk operating system (DOS) is assumed to be IBM PC DOS. This is done for the sake of clarity, and because the operations and DOS services of this combination are typical of a class of machine in which this system is useful. It should be understood that these DOS and hardware operations are intended to be representative of all analogous operations on this or other possible host systems under this or other operating systems.

A software copy protection system employing a shared higher level of privilege is composed of two parts; the hardware privilege support system installed in the work station, and the floppy disks or other magnetic medium which are used to transport the software from the vendor to the user. The floppy disk and the support hardware are modified by the first attempt to use the software on the disk. These modifications make the fact that the disk has been loaded detectable.

Disks which are used with this system are prepared by creating two kinds of marks on the disk which are not producible by conventional disk drives but which can be detected by them. These marks are in the form of the absence of material which can have its magnetization changed by a disk drive write head (the medium coating is either absent or replaced with higher coercivity material) and in the form of domains which cannot be created by conventional disk drive write heads (for instance a region in which the orientation of the domain remains unchanged for distances large enough to cause a loss of synchronization in the disk system).

For the remainder of this description, marks which are made by modifying the medium will be referred to as MM marks, and marks which are made by the creation of a domain pattern will be referred to as DP marks.

Both these marks have properties such as location and extent, which can be used to encode information. The location and extent of the DP marks and the location and extent of the MM marks can be detected by use of appropriate procedures on conventional disk drives.

The location within a given sector of the DP type of mark may be found by reading a sector twice, and comparing the results of the two read operations. Since DP marked sectors do not contain the transitions needed by the disk control system to keep its clock synchronized, the two read operation will reliably show different data in the portion of the sector which follows the beginning of the DP mark. The location of the DP mark found by this method is approximately reproducible within limits set by the hardware in the disk system.

The marks made by modifying the magnetic medium are detected by a sequence of operations. First, a pattern of domains such that some domain transitions coincide with the MM marks is written to the sector containing the marks. The sector is then read, and the results of the read operation are compared with the result expected given the write operation if the sector had been unmarked. The location and extent of the marks can be derived from the results of this comparison.

The MM marks can be "written" on the disk by laser photodecomposition ablation as described in previously referenced patent application Ser. No. 06-567,294. DP marks may then be made over MM marks by moving a formatted disk through a uniform magnetic field of width approximately equal to the width of a sector, so that sectors with MM marks are swept by the magnetic field. A band of large magnetic domains is thus created across the disk. The disk is then reformatted on all the tracks except those containing MM marks.

A disk treated this way would then contain both kinds of marks, with the DP marks covering the MM marks.

It is important to note that the operations required to "read" the MM marks are exactly the kind which will destroy the DP kind of marks. That is, the act of writing a pattern onto a sector will create domains on the disk which will support the synchronization in the disk system.

On a protected disk, the DP marks are made over a sector containing the MM marks. This is done in order to insure that the DP mark will be destroyed by reading the MM marks which lie "below" it. Any domain structure which both cannot be made by a conventional drive and which can be measured in some way by a read operations can be used for this purpose.

The location and extent of both kinds of mark are recorded in a file on the disk. This information can be used in the preparation of other files on the disk but it is always encrypted before the disk preparation is complete.

In addition to the marks there are files stored on the disk. The files fall into two categories: (1) the protected application software, and (2) the information needed by the support hardware to load and run the encrypted part of the application.

The application software must consist of at least one file of encrypted program. This part of the application is encrypted with a key provided by the software vendor. The decryption key for that file is itself encrypted with an RSA public key provided by the manufacturer of the support hardware. This encrypted decryption key (EDK) is also recorded in a file on the disk. It is in the best interest of the software vendor to encrypt those fractions of the application software which he considers proprietary, as it is the encrypted fraction of the software which will be protected from redistribution by the user. A complete, prepared disk which is ready to be sold or released consists of at least:

1. A doubly marked region which could be unique to the disk.
2. An application which consists of at least one file of program encrypted with a key selected by the software vendor which may include the disk marking parameters in the key.
3. The decryption key in encrypted form where the encryption is by the RSA public key provided by the support hardware manufacturer.
4. A program which calls for the services support hardware (first-use-initialization and load-decrypt-run), and which obtains services from the host for the support hardware at its request.
5. The descriptions of the doubly marked region(s) in an encrypted form where the encryption key is the same key used with the application software.

It should be noted here that the RSA private decryption key must be kept a secret by the hardware manufacturer, and that the software vendor is better protected if the encryption key used to protect his software includes the marking information. The encryption key can be made unique to each disk by this method. It should be clear that the degree of protection offered by this system depends on the fraction of the total protection system utilized by an implementer.

If piracy of a protected disk is attempted at this point, then the pirate could be attempting to make copies of the disk on which the vendor has supplied the protected software which will work without the support hardware, or which can be transported to systems with the support hardware. Each case will be discussed separately.

If the pirate wanted to make copies of the disk which will operate on systems which contain the support hardware, then he must duplicate all the features of the ready-for-distribution disk. Any conventional copying program should be able to copy the encrypted application and the encrypted decryption key in the encrypted non-executable form, but no conventional disk drive could make the doubly marked region. No copy program running on a personal computer has the hardware facilities needed to copy that part of the distribution disk. As will be seen later, the support hardware utilizes and changes the mark at the first-use-initialization. It will not accept the transfer of the data need to run the protected program if at the first use of a protected program it does not find a doubly marked region whose marks correspond correctly to the descriptions of the marks stored in an encrypted file. Piracy by copying the protected disk for use on a support-hardware-equipped system is thus inhibited by the difficulties of duplicating the doubly marked region(s).

If the pirate wishes to make copies of the disk which will run on systems without support hardware, he must first decrypt those parts of the application program which have been encrypted. Since there are two processors in support hardware equipped system, it is possible that the application may be written to operate concurrently on the two processors, or use special facilities on the support hardware. If so, the application must be drastically modified to be operational.

Piracy by copying a decrypted version of the application is thus inhibited by the strength of the encryption method used to render the application and the EDK unreadable. It is practical to make this a virtually insurmountable task. Even if this were accomplished, the software could still be useless unless it were rewritten to run without a coprocessor.

In order for the copy protection system to be useful, it is necessary not only that no useful copy can be made of the distribution disk, but also that:

1. The distribution disk be able to be used in one and only one system.
2. The user be able to make unlimited quantities of backup copies of the disk, all of which are useless on other systems.
3. The software never reside in system memory in a form which allows the user to make a binary image of the system memory with a complete working version of the application which could be loaded in other systems.

This part of the protection system is implemented with the support hardware. The support hardware is itself a computing system. It has its own processor, firmware in read only memory (ROM), hardware timers, a real time clock (or other hardware means for obtaining a "random" number), and RAM. It could be installed in a personal computer as a card set. It communicates with the system in which it resides through a region of common memory, and through a set of registers which reside in the port address space of the host system. It is important to note that the common memory is part of the support hardware system. The support hardware controls its bus transceivers and can cause this memory to be unavailable to the host for read operations. Other configurations are possible, but all require that only a portion of the support hardware memory be addressable by the host system. It is also necessary that the portion of the support hardware memory which is not addressable by the host system be physically inaccessible to the user. It is this memory in which the support hardware will decrypt and run the encrypted portion of the application software.

In addition to the processor, common memory, hardware timers, and port addressed registers, the support hardware has physically and logically secure memory space which contains ROM and EEPROM memory devices.

The ROM devices contain the system firmware. It is in the form of a monitor whose commands are the services which the host system may request from the support hardware. A complete set of such services would include as a minimum set:
1. Perform first-use initialization.
2. Load, decrypt, and run application.

The EEPROM device is used by the support hardware as a secure, nonvolatile memory in which decryption keys of initialized applications are stored.

The point should be made that the processor in the support hardware must have at least two levels of privilege itself so that the memory occupied by the EEPROM and the ROM, and the clock and hardware timers, can be properly secured from the user.

All applications software decrypted and run on the support hardware is at a lower level of privilege than the ROM resident firmware which controls EEPROM access, loading, decrypting, and running operations. This structure is needed in the support hardware to prevent the user from writing a monitor which would run on the support hardware which would access the firmware and the EEPROM and dump the contents of these into common memory.

As was noted earlier, the support hardware must be physically as well as logically secure. This security is required in order to prevent the user from using logic analyzers or other digital control and recording devices to gain a record of the content of the secure memory space. It is worth noting that, given the present state of the art of semiconductor technology, physical security for the support hardware could be obtained by packaging the complete support system in a single chip package. This package could be built so that any effort at physical access (to probe the memory content to obtain a set of decryption keys and algorithms) would destroy the information in the ROM and EEPROM. This could be accomplished with a combination of piezo-electric drives (to destroy the MOS gates in the memory devices if the package were stressed sufficiently or if stress in the package were released) and conducting lines on the IC or package which would oxidize rapidly if the package were opened in the air.

While a single IC package is the preferred packaging technique for the support hardware, the system could be built by at least two other methods:
1. As a set of chips which communicate with each other over a proprietary encrypted bus.
2. As a conventional chip set assembled on a board and encapsulated with a tamper protection system.

The support hardware is an addition made to a "Host" Individual Work Station. This work station is a single common bus microprocessor based computer system. The IBM PC is typical of this class of machines. Such systems use the bus (which can be an array of transmission lines with sockets at intervals) as a communications medium between logically separate subsystems. Some of these subsystems may reside on the same packaging element (in this case a printed circuit board called the "System Board") as supports the bus. Subsystems which are necessary to the function of the system or for expansion of the function of the system are added by attachment to the bus through the sockets. It should be noted that the components which constitute a subsystem may be made so that parts of the subsystem may reside on different packaging elements.

The complement of subsystems which are shown in FIG. 1, in the region labeled "Conventional Computing System" as indicated at 2, is an example of a common, nearly minimal host system. The host CPU 4 is a single chip microprocessor and a group of support chips. The host CPU 4 is supplied with a periodic signal called a clock and with connection to the bus by the support chips. The microprocessor is commonly supplied with more support than this, but all support is aimed at executing a repeating cycle of fetches of instructions from memory, fetches of data from some selected element of the system (such as Random Access Memory), execution of instructions, and when needed, storage of resulting data in a selected element of the system. The host CPU 4 may have support supplied to it called direct memory access (DMA) which allows the microprocessor to be relieved of tasks which involve the movement of data from one addressable element to another.

The microprocessor controls the type of bus operation performed (fetch, store, etc.) and the type of element selected (RAM, Port Addressed Register, etc.) by which of the control lines in the bus is "asserted" (changed to the appropriate potential according to a protocol called the bus definition). By these means, the microprocessor is able to obtain a collection of instructions (called a program), execute the instructions on a set of data, and cause the data stored in other elements of the system to change as a consequence of the execution of the instructions.

The RAM 6 is a subsystem from which data can be fetched from or written to by the host CPU 4. It is the subsystem used to store data and instructions which are loaded from some other source. If it has meaningful content, then that content has been written to it by the host CPU 4. At the time that the computer is powered on, the RAM 6 contents are, for practical purposes, meaningless.

The ROM 8 is a subsystem from which data can only be fetched. It may contain a collection of programs which are needed to start useful operation of the computer and which are useful for controlling the remaining subsystems.

The remaining subsystems, terminal control unit 9, display 11, input device 13, disk system control unit 15 and disk drive 17 can be characterized as having both addressable elements and mechanical, optical, or electromagnetic (or other) elements which can affect human senses, be affected by human actions, or manipulate magnetic medium to perform read and write operations involving creating and sensing the boundaries between magnetic domains on the magnetic medium. The contents of some of the addressable elements control the actions of the mechanical, optical, and electromagnetic effectors of the subsystem, and the contents of other addressable elements are controlled by the mechanical, or electromagnetic elements. Thus, by these means, it is possible for the computing system to interact with a user and with magnetic media. The subsystem which provides the elements needed to interact with the user is called the terminal control subsystem. The common form of subsystems which allow read and write operations on magnetic medium are called disk control systems. Given these elements it is possible to describe in broad outline, the operation of such systems.

At the time of power up, the microprocessor executes an instruction fetch from a fixed location in memory. This address is one which is occupied by the ROM 8. The instruction stored in that location is a jump to the programs which have the effect of testing and initializing the system for use. One of the system initialization programs causes a program called the Disk Operating System (DOS) to be read from a disk and executed. This program (the DOS) is able to accept commands from the user through the use of the terminal control system. These commands include causing a program chosen by the user to execute on the system by naming the file (using the manual input) in which the program resides to the DOS program.

The complement of subsystems which are shown in FIG. 1, as indicated at 10 and 22 is an example of a minimal Support Hardware System. The elements of the support hardware may be thought of as consisting of two parts. One part (at 22) contains addressable elements which allow the support hardware to communicate with the host hardware so that commands and data may be exchanged (much as between a user and the host system). The other part (at 10) contains the support CPU 12, RAM 14, ROM 16, and other elements (timers, real time clock 18, and EEPROM 20), not concerned directly with communicating with the host system.

The EEPROM 20 (Electronically Erasable Programmable Read Only Memory) is a type of semiconductor memory. It has the properties of RAM, in the sense that its contents can be modified by write operations performed by the support CPU, and the properties of ROM in the sense that its contents are not lost at power-off-time.

The timers 18 are subsystems which can, for example, decrement a number stored in a register each time a clock signal is asserted on the clock line of the bus. Timers are given this number and told when to start decrementing by the support CPU writing to addressable elements within the timer subsystem. The current value in the register can generally be read by the support CPU, and the timer subsystem can be built so that it will assert a line on the bus when the value has reached zero.

A real time clock is a subsystem which contains a specialized counter and a battery. The battery supplies power to the real time clock and its support chips during the period when the computing system is turned off. The counter increments its registers in response to clock signals generated by its support chips so that its registers reflect the interval of time since the registers where initialized. Thus, if the registers were initialized to the time of day, then their contents would approximately track the time of day. The registers of the real time clock can be read by the support CPU.

The part of the support hardware which communicates with the host hardware so that commands and data may be exchanged, consists of three subsystems 22.

The first subsystem is a set of addressable elements which can be read and written by both the host and the support systems. These elements are called registers 24 and are used as a communications path between the host 2 and the support systems 10. The registers 24 may be a duplex communications path, that is at any given time only one system (host 2 or support 10) may write to the registers while the other may only read (with the writing and reading roles swapped under the control of the support hardware), or a simplex communication path, that is one with some registers permanently set to be written to by one system and read from by the other, or they may implement an "access collision protocol" or any combination of the above.

The second subsystem is a "Two Port RAM" 26, which is a block of RAM which may be accessed by either systems' CPU by implementing any of the arrangements described above as possible implementations of the register based communications path. In general the register 24 path is a useful method for communicating commands while the RAM 26 path is useful for communicating blocks of data as the RAM contains the region of memory which is common to the host and the support hardware.

The third subsystem is a block of "Bus Receivers" 28. These are not addressable from the host CPU 4 but are addressable as read only elements from the support hardware side 10. This system is provided to allow the support hardware to observe the operations taking place within the host system hardware. While the host system addressable elements cannot be directly accessed by the support system since it cannot assert the control lines on the host bus, the support system can obtain a picture of the actions being taken by the host system by recording the states of each of the lines on the host bus. The support hardware can, by this method, determine what instructions are being executed by the host, and compare them with the list of instructions expected if the host were executing the service requested of it by the support hardware.

A word should be said here about the question of access to the addressable elements. Each such element may be thought of as observing an array of lines in a bus called the address lines, an array of lines in a bus called the data lines, and an array of lines in a bus called the control lines. A sub-part within every addressable element is an element called an address decoder. The address decoder opens the data lines to access the addressable elements contents if and only if both the address represented by the asserted lines among the address lines and the control signal among the control lines are correct and appropriate for the addressable element. If the address of an element is not present on a bus then the data stored in that element cannot be accessed at that time. Further, if a processor cannot assert either control or address lines which are "observed" by an addressable element or observe its data lines then the content of that addressable element is said to be logically inaccessible or secure from that processor. This is the relationship between all non-communicating addressable elements in the support hardware and the host processor. The operations of the support hardware carried out in these elements are thus completely hidden from the host processor. Data may be moved from these elements to the host only through the medium of support CPU data moves from secure addressable elements to communicating addressable elements. The host hardware, on the other hand cannot hide any of its actions from the support hardware since its bus can be observed by the support hardware through the medium of the Bus Receivers.

Given these elements it is possible to describe in broad outline, the operation of the support hardware in the context of the host hardware.

The CPU, RAM, and ROM of the support hardware function much as in the host hardware in the sense that when powered on, the processor begins by executing the instructions found at a fixed location in a ROM which it can address. The operations it performs in cooperation with the host are described in detail in the flow charts which follow.

As was set forth above, software protected by this system is distributed on magnetic medium such as floppy disks. How the previously referred to MM and DP marks are formed in the magnetic medium to create doubly marked regions with be described relative to FIGS. 2.0–2.3.

FIG. 2.0 illustrates a section of a disk 30 with an indicium such as medium mark 32. The mark 32 can be incorporated in the disk 30 either during, or subsequent to the manufacturing process. The mark 32 changes the magnetic properties of certain select areas or locations on the disk such that they no longer respond to the write head by changing their magnetic orientation. Marks may range in size from the area occupied by a single bit to the size of a full track. For purposes of writing information to the disk, these areas are essentially nonmagnetic or permanently magnetized, that is, nonmagnetic or permanently magnetized indicia are formed on the medium at these select areas or locations. Nonmagnetic areas may be created by removing magnetic material from select areas, whereas permanently magnetized areas may be created by adding a material to select areas, that has a sufficiently higher coercivity than the original magnetic material on the disk. A detailed description of how to add the marks 32 is set forth below.

Nonmagnetic indicia are produced during manufacture on different types of medium by essentially similar processes. For example, all medium manufacturing involves the coating of a substrate with a carrier of magnetizable particles. The carrier is a liquid at the start of the process and is called the "ink". In the case of floppy disks and tapes, the ink is filtered to assure particle size uniformity and is sprayed, wiped, rollered or otherwise coated onto a "substrate" generally made of the plastic Mylar. (Mylar is a trademark of the DuPont Corporation.) The coated substrate is passed between hot and cold rollers to dry and level the ink and to fix the coating thickness. The completed medium is cut into disk or ribbon form and packaged to make floppy disks or tapes. If the substrate were premarked with a formulation of the ink which contained no magnetizable particles, or which contained magnetizable particles of higher coercivity than can be affected by conventional write heads, then the ink in the premarked region would displace the normal ink in those regions when normal manufacturing proceeded. On completion of the manufacture process, the premarked regions would constitute nonmagnetic, or permanently magnetized, indicia.

A second way to create nonmagnetic indicia during manufacture is to create a raised pattern on the substrate before it is coated. During the inking process, the ink will avoid the raised areas, which will then remain nonmagnetic. These raised regions can be created in two ways. (1) Use a photolithographic technique. Coat the substrate or platter with the photosensitive material, and use a mask to expose the material optically. Then wash away all of the exposed photosensitive material. Next, coat the substrate with ink as usual. When the ink has set, remove the remaining photoresist, and, if desired, backfill the resulting holes with nonmagnetic, or permanently magnetizable, material. (2) Stamp and heat the substrate with a die which contains the desired pattern of raised spots, then coat the substrate with ink as usual.

A third way of creating nonmagnetic indicia during manufacture is to coat the desired areas of the substrate with a material to which the ink will not adhere, then accomplish the inking process as usual. The nonmagnetic indicia then appear as holes in the magnetic coating.

Disks that have already been manufactured may have indicia such as marks incorporated onto them. This may be performed by the disk manufacturer, by the software distributor, or by a third-party original equipment manufacturer. There are several ways of accomplishing this, of which two will be detailed. The first way is to remove the magnetic material from the area where indicia are to be formed. This can be done in at least three ways. The first is to thermally ablate or photodecompose the magnetic material with, for instance, a laser. This has the advantage that it is fast, and reproducible. Furthermore, the pattern of indicia can be changed easily from one disk to the next by programming the laser pulses appropriately. In a mass-production environment, an effective arrangement would be to spin the disk in front of a laser. The laser would then ablate the desired pattern circumferentially along one or more disk tracks. The process of writing the pattern onto the disk in a known position would take fewer than two rotations of the disk. If necessary, surface irregularities can be removed by polishing after the ablation process is complete. The second way to remove the magnetic material is abrasively, by mechanical means, in the desired pattern. The third way to remove the magnetic material is to heat the disk material dielectrically, for example, to melt it in the right spots, and remove the magnetic material by magnetic migration, or mechanical means.

A second way of creating nonmagnetic indicia on already manufactured disks is to emboss the finished disk surface with a mechanical die. This depresses the magnetic material away from the read head far enough that it is not detected as magnetic. Because this will deform both disk surfaces, it can be only used on single-sided floppy disks.

FIG. 2.1, illustrates the disk 30 formatted in a normal manner, with the medium mark 32 situated in a formatted sector 34. It is to be appreciated that the mark 32 may be as small as one bit location in a sector, or may lie in one or more formatted sectors.

As shown in FIG. 2.2, a magnetic field is applied to the area of the disk containing the mark 32. The field disrupts or alters the usual sector structure in this area resulting in a region 36 containing large domains.

The disk 30 is reformatted, as shown in FIG. 2.3, in all sectors except those containing the marks 32. All of the formatted sectors behave as normal sectors, and can have useful data written into them. The sector 34 which contains the medium marks 32 now also contains a second indicium or mark, such as domain pattern marks 38, which can be utilized in the copy protection method to be described.

The use of the doubly-marked regions will now be described relative to FIGS. 3 and 4.1–4.4.

FIG. 3 illustrates a sector 34 of a disk, having the medium mark 32 formed inside the domain pattern mark 36, which is typically inside the data record of the sector, which contains the normal data 40.

FIG. 4.0–4.3 illustrate the four step process to measure the domain pattern mark 38 and the medium mark 32. In step 1, as illustrated in FIG. 4.0, data 42 read from the domain pattern mark 38 differs from normal data in that it may be different on subsequent reads. In step 2, as illustrated in FIG. 4.1, the sector is read again, and because of the presence of the domain pattern mark 38, the data 42' read from the region of the mark differs from the data 42 read in step 1. The approximate location and extent of these differences verify the existence of and measure the domain pattern mark 36. In step 3 as illustrated in FIG. 4.2 data is written into the sector which destroys the domain pattern mark replacing it with normal data. The medium mark 32 is unaffected. In step 4, as illustrated in FIG. 4.3, the sector is read again, and because of the presence of the medium mark 32, this read data differs, in a predictable way, from the data just written. This allows the program to verify the existence of and measure the medium mark.

The flow charts that follow show the operations which are being performed concurrently in the host hardware 2 and in the support hardware 10 of FIG. 1. Some of the procedure boxes in these charts refer to very low level operations such as putting a digital word in a register, while some refer to the execution of large algorithms. The flow charts are divided into four parts. These describe: (1) the support software in the host, (2) the first use initialization (FUI) function (and its entry) on the support hardware, (3) the load, decrypt run (LDR) function (and its entry) on the support hardware, and (4) some detailed expansion of some of the function blocks in the FUI and LDR flow charts. Some FUI and LDR function blocks which represent large algorithms and some such function blocks in the expansions are not themselves expanded. The algorithms they represent can be found in common references on the subjects of computing systems, operating systems (in general or specifically the IBM PC DOS), and encryption, or else are trivial to code. These function blocks have to do with the generations of "random" sequences, RSA encryption and decryption, general encryption and decryption, and calls for DOS services.

Information about PC DOS service can be found in the manuals; the "IBM Disk Operating System" IBM Part Number 6024061 and the "IBM Technical Reference" IBM Part Number 6025005 or IBM Part Number 6936808.

Broad description of encryption and decryption operations needed for all blocks calling for encryption or decryption can be found in "Mathematics of Public-Key Cryptography" Martin E. Hellman Scientific American, August 1979, P. 146-157, and references cited therein, and are common knowledge to those skilled in these arts.

Refer now to FIG. 5, which is a flow chart indicative of how the support software executes in the host hardware. The first use of a protected disk causes the first-use-initialization (FUI) function to be performed. The FUI function begins when the user inserts an unused distribution disk using the described copy-protection system into the "current drive" on the user's support hardware equipped system. The user calls for the execution of the protected software by typing the name of the program and pressing ENTER. The DOS, as indicated at 44, finds the file on the disk which has that name, loads it, and begins execution. The file is in fact the program mentioned earlier which calls and supports the services of the support hardware (first-use-initialization and load-decrypt-run). This program runs on the host hardware. The support software examines the disk directory as indicated at 46 to determine if a file called the Key Index File (KIF) is present. The absence of this file indicates that the disk is to be initialized. This file is created in the initialization process. The protection of the software is in no way dependent on this file. In the absence of this file, the support software sets a flag in a port addressed register in the support hardware to request the start of the FUI function, as indicated at 50, and then polls the register as indicated at 54 and 56 to obtain service requests from the support hardware. Alternatively, the support hardware could itself load the service a program into the common memory, allow read access, and request execution of that program by the support software. In the event that the KIF is present, the program proceeds as indicated at 52 to set the communication registers to request LDR. In either instance, the communication registers are read, as indicated at 54, to determine if services are requested as indicated at 56. If service is not requested, the program loops back to the start of 54. In the event of a service request, the program proceeds as indicated at 58 to read the communication registers. As indicated at 60, it is determined if the support hardware wants the service to begin. This is a synchronization procedure. In the event that there is no such request, the program loops back to the start of 58. If a begin has been requested, the program proceeds as indicated at 62 to execute the service request. On completion of service the program in the support software loops back to the start of the read communication register 54 for further requests from the support hardware.

Figure 6:
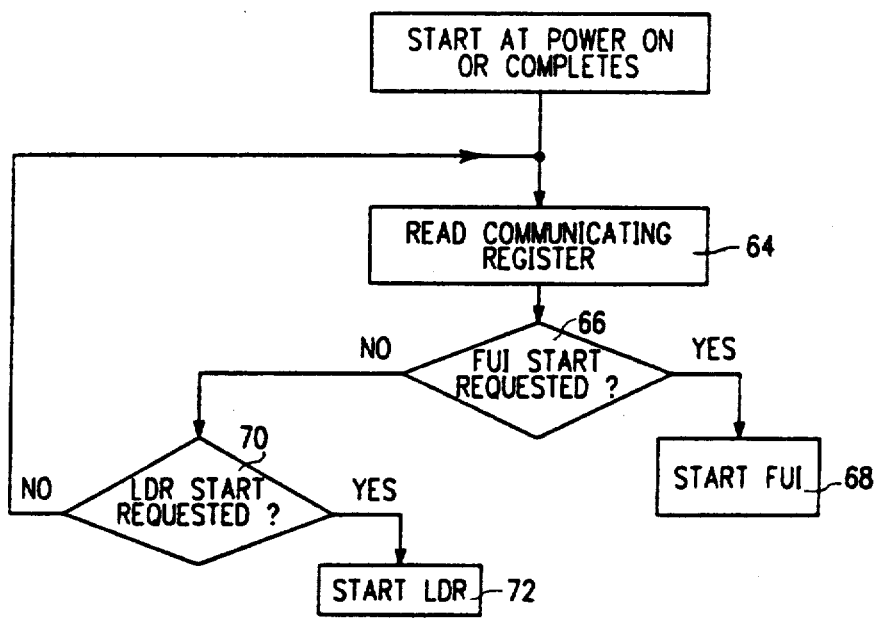
FIG. 6 is a flow chart illustrating the monitor software which executes in the support hardware.

FIG. 6 illustrates the monitor software executing in the support hardware during the same time frame. The support hardware reads the communicating register as indicated at 64. The support hardware then determines as indicated at 66, if an FUI start request has occurred. In the event it has occurred, the FUI is started as indicated at 68. This program is illustrated in detail in FIG. 7. In the event the FUI start request has not occurred, the program proceeds to 70 to determine if LDR start has been requested. In the event there is no such request the program returns to the start of 64 to once again read the communicating register. In the event an LDR start request has occurred, the program then proceeds to 72 to start LDR. This program is described in detail relative to FIG. 11.

Refer to FIGS. 7.1 through 7.3 which constitute a detailed flow chart, taken with FIG. 7.1 on the top, FIG. 7.2 in the middle and FIG. 7.3 on the bottom of the FUI program which executes in the support hardware. The support hardware sees the FUI request in the communicating register and sets the common memory to write-only as indicated at 74, from the host point of view, and begins to observe the control lines on the bus. It should be noted that the firmware in the support hardware contains a copy of the support software which is running on the host. The host processor has to fetch its instructions from memory. If the sequence of instructions fetched by the host is not identical to the sequence known to the support hardware, then the user may be attempting to obtain a copy of the initialization transactions by using his own version the of support software to record the transactions. In this instance the support hardware terminates operation and the attempt to obtain information about the installation transactions through the use of a user-written variation of the support software is foiled. Any variation of the support software which supplies forged information from a file or memory is also foiled at this point. It is worth noting that in a Single Operator System, which will yield control of the bus to other masters (as in Multibus a trademark of Intel Corp.), the support hardware may not need to go to these lengths to obtain the same level of protection.

The support hardware requests, as indicated at 76, that the encrypted-decryption-key (EDK) and the encrypted file describing the doubly marked region of the disk (EMD or encrypted mark descriptor) to be loaded into the common memory. The FUI program executing in the support hardware then proceeds to 78 to monitor the host bus for compliance, halting 82 in the event that it detects unexpected operations on the host bus. In the event there is compliance, the program proceeds to 84 and the support hardware uses the RSA private decryption key built in by the hardware manufacturer to decrypt the EDK thus producing the Decrypted decryption key (DDK). The program then proceeds to 86 and the support hardware uses the DDK to decrypt the EMD thus producing the decrypted mark descriptor (DMD). The program then proceeds to 88 to determine information about the doubly marked region, which is obtained by service request from the support hardware which implement the previously described methods for reading marks, thus irreversibly altering the doubly marked region.

It should be noted that efforts at using digital recording devices to obtain a record of the installation transactions to replay for piracy purposes can be foiled at this point by two methods. The request made by the support hardware can include sector reads and writes which are superfluous. In this way an overwhelming volume of data can be generated which the pirate must wade through. Since the support workings are hidden from the user, the pirate is also given no clue as to what part of the transaction has significance. In addition, the support hardware may use a real-time-clock, also in secure space, to randomize the obfuscating requests so that each possible installation transaction on a given support hardware system will be different. These procedures are implemented in 88 and 102 in the service-request-monitor-bus-for-compliance-loop 136 which follows. Additionally, the pattern written to the marked sector(s) to detect the MM marks may be made random in content to make efforts to fool the support hardware, by "replaying" the host side of successful installation, ineffective.

Refer briefly to FIG. 8 which is a more detailed flow chart of the flow chart block 88 of FIG. 7.2. As indicated at 90, real-time-clock is read and a random number sequence is generated as indicated at 92. The sequence is normalized to the number of sectors on the disk as indicated at 94. As indicated at 96, all numbers are removed in sequence, which reference marked sectors. Then, as indicated at 98, a random monotonically increasing sequence is generated with a number of elements equal to the number of disk reads and writes needed to get measurement of the doubly marked region. This sequence of numbers is normalized to the number of elements in the sequence generated in 92 as indicated at 100. The program then proceeds to program block 102 in FIG. 7.2.

The net effect of these procedures is to generate two sequences of numbers to be used later in the FUI operation. One sequence is a random list of sector numbers. These sectors will be read and written to obscure the reads and writes used to measure the marks. The other sequence is a list of numbers indicating when in the obfuscating sequence of reads and writes, should a significant read or write be performed. The sequence of operations dictated by this list is dependent on information unavailable to the user (real time clock state and randomizing algorithm). Thus, it acts to foil efforts at forging the host suppled data to allow initialization of more than one system.

As indicated at 102 a service request using the next element of the sector sequence as an argument is placed in the communicating registers. A more detailed flow chart of the program step 102 is indicated in the flow chart of FIGS. 9.1 and 9.2. As indicated at 104, the next element in the sector sequence is determined. The position of the number in the sector sequence is looked at to determine if it is equal to any number in the sequence prepared at 100 in FIG. 8 as indicated at 106. Note that on the first request, the "next" element is the first element of the sector sequence. In response to this determination as indicated at 108, if the determination is yes the program proceeds to 110 where the next read or write needed to get MD data is requested, with the program then moving the sector contents to the secure RAM as indicated at 112, with program then moving to 114 to set the common memory to write only. If the response to the question at 108 was no, the program proceeds to 116 to determine if this number appears again in the sequence. This determination is accomplished at 118, and if the answer is yes the program proceeds to 120 to request reading of a sector with that number, and then as indicated at 122, moves the sector contents from common memory to secure RAM to use at a later time for an obfuscating write operation. The program then proceeding to 114 to set the common memory to write only. In the event the response was no at 118, the program proceeds to 124 to determine if the number appeared an odd number of times before in the sector sequence. This determination is made at 126, and if the answer is yes the program moves to 128 to move the stored contents of the sector to the common memory and to set common memory and to read-write, and then moves to 130 to request a write to that sector with contents from the common memory. In the event the response was no at 126 the program moves to 132 to request reading of the sector with that number, with a pause then occurring as indicated at 134, in order to make the time required for each of these possible courses the same. This further obscures the functions performed by the support hardware from the users'-point of view. The program then advances to 114 to set the common memory to write only.

The net effect of these procedures is to request of the host system a "random" sequence of disk read and write operations with the required read and write operations embedded. The sequence of sectors accessed for obfuscation purposes and the points in that sequence where the measurement accesses are performed are determined by the two sequences generated in 88. Since these sequences are unique and are determined by the support hardware at the time of FUI, efforts at forging the transaction are foiled.

Return now to FIG. 7.2. The program then advances from 102 to 136 to monitor the bus for compliance as indicated at 136, with test for compliance occurring at 138. In the event there is no compliance the program moves to 140 to halt. In the event there is compliance the program advances to 141 to test if the last request for service is complete. If the answer is no the program returns to 102 to once more complete the loop. In the event the determination is yes the program advances to 142 to calculate mark descriptors (MD) from the data. The support hardware moves the significant data, loaded into common memory by the support software, into secure memory. It now derives the MD from the data. A comparison is made with DMD as indicated at 144, to test for a valid MD as indicated at 145. The support hardware compares the DMD to the MD to determine whether or not the MD is within hardware caused variation limits of the DMD. If it is not, then the disk has been identified as a forgery, and processing halts as indicated at 146. Alternatively, if several doubly marked regions and several DMDs have been provided on the disk then the support hardware could retry with these. In the event that MD is valid the program advances to 148 to verify if the double marks are gone, with this verification being similar to the steps set forth previously relative to 88 through 144. The support hardware causes a new set of data about the doubly marked region to be obtained by the support software. If the comparison result from the first MD is within acceptable limits and the new MD indicates that the DP mark has been destroyed and that the disk present in the system is indeed the original distribution disk (as shown by its pattern of the MM marks) then the test at 150 will prove true, otherwise the program proceeds to 152 and halts. In the event there is verification of erasure of the marks the program proceeds to 154 with key index (KI) being placed in common memory and the DDK referenced by the KI being stored in the EEPROM. The common memory is set to read/write at 155. The communicating registers are then set to request a file create and write as indicated at 156 to store the KI in a Key Index File (KIF), with the program completing as indicated at 158.

The support software executing in the host fields the request, and responds to it by creating the KIF and storing the KI in it.

The FUI function is complete. The support software could now call for the load-decrypt-run function or could return control of the system to the user.

At this stage in the process, the disk and the support hardware have both been modified by the FUI function. The doubly marked regions were destroyed in the process of finding the nonmagnetizable regions which constitute the MM marks. The support hardware has been changed by the addition of a new DDK to its EEPROM. The DDK has never been exposed in the user memory on the host hardware. After its decryption the user is only given an index into user inaccessible memory to reference it. Backup copies made before FUI will be useless since they do not have a KIF. They will, thus, appear to need FUI. Since they lack a correct doubly marked region, however, the FUI will fail. The marked region on the original will not be used for subsequent operations and is not in a form which is acceptable to other support hardware equipped systems. The EDK thus will not be decrypted to a DDK and installed in any other system. The KIF will not reference a correct decryption key in any other system.

After FUI, the user may make any number of backup copies of the disk. In addition, copies of the files on the disk may be placed on the user's hard disk for convenience. The information (the DDK) resides in usable (decrypted) form only in the support hardware that performed the initialization for that particular copy of the distribution software. Thus no backup copy made by the user is of any use to any other user, but each (made after FUI) is a perfectly good backup for the first user.

If piracy of a protected disk is attempted after FUI, then the pirate could be attempting to make copies of the protected software which will work without the support hardware or which can be transported to systems with the support hardware. Making copies for systems with no support hardware faces the same impediments which it did before FUI. Making any quantity (greater than one) of copied disks for transport to other systems containing support hardware faces the same difficulties as before. It is within the realm of possibility that the DP marks may be reproduced on the distribution disk, thus rendering it re-usable for FUI on another system. If this difficult task (requiring specialized equipment) is successful, its success can only be determined by performing the FUI operation on the target system. This will probably require some retries at each restoration. Both the cost of retrying in this way and the fact that only one particular disk (containing MM marks) can transport the pirated software dramatically reduces the availability and spread of any successfully pirated application.

FIG. 10 is a flow chart of the monitoring the host for compliance function used in the FUI procedure. Host monitoring assumes that either the support hardware is substantially faster than the host or that the support hardware contains fast hardware dedicated to this task. Once the program is started, the host bus state is read as indicated at 160. A determination is made, as indicated at 162 to determine if the host is polling the communicating register as this is all the host should be doing. In the event such polling is not all that is taking place, the program proceeds to 164 and halts. In the event such polling is taking place, the program proceeds to 166 to signal the host to begin. The next instruction to be executed by the host is fetched from ROM, as indicated at 168 as is a counter setting. The counter setting is the approximate time the host needs to execute the instruction fetch phase of its operation. The counter is then set to this value as indicated at 170. The support hardware then watches (through the bus receivers) the host bus for memory fetches as indicated at 172. The counter is tested for zero as indicated at 174 to see if time allowed for a fetch has expired. If the counter is equal to 0 the program proceeds to 176 and halts. If the counter is not equal to 0 the program proceeds to 178 to determine if the expected instruction was fetched. If the expected instruction was not fetched the program returns to 172. If the expected instruction was fetched the program proceeds to 180 to determine if the instruction fetched was the last instruction. If this was the last instruction the program proceeds to 182 and exits. In the event this was not the last instruction, the program loops back to 168 to fetch the next instruction it expects the host to fetch if the host is complying.

This completes the FUI procedure. For all subsequent uses of the application software the user inserts an initialized distribution disk or a backup copy of the disk into the "current drive" on his system. If he has backed up the disk on a hard disk then he may skip this step. The user then calls for the execution of the application software by typing the name of the program and pressing ENTER. The DOS finds the file on the disk which has that name, loads it, and begins to execute it. The file is in fact the support software mentioned earlier which calls and supports the services of the support hardware (first-use-initialization and load-decrypt-run).

Figure 11:
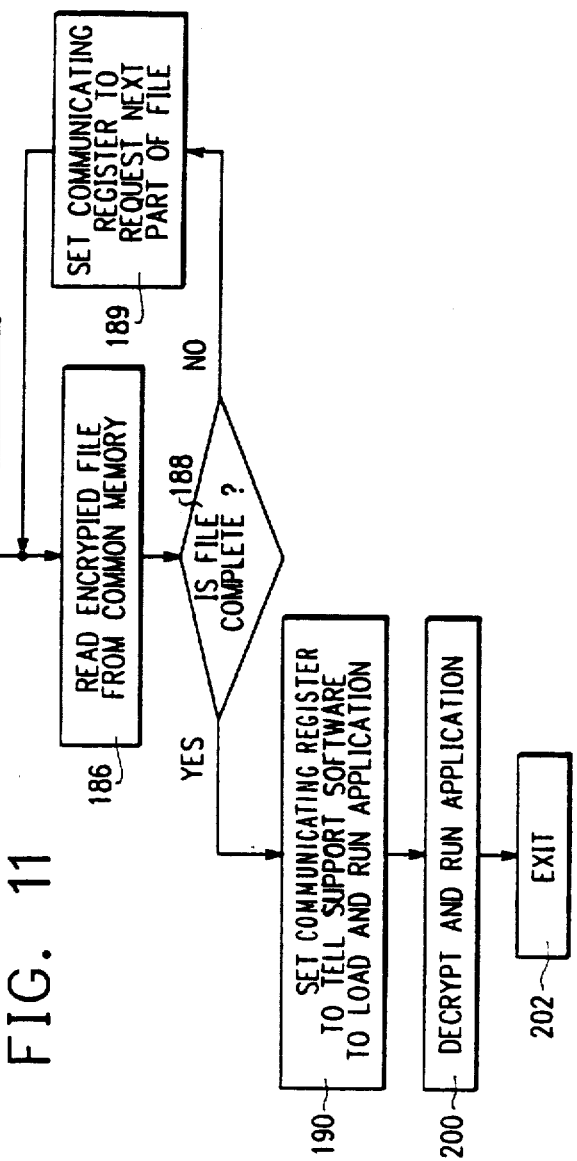
FIG. 11 is a flow chart of the load-decrypt-run (LDR) program according to the invention.

The support software examines the disk directory and determines that there IS a file present which indicates that the disk is initialized. This file is the KIF. The support software loads the KIF and the encrypted part of the application into the common memory. A flag is set in a port addressed register in the support hardware to request the start of the LDR function. Refer now to FIG. 11, which is a program flow chart for LDR function. The LDR function is started as indicated at 72. The support hardware begins the LDR operations by moving the data loaded into common memory by the support software into secure memory, as indicated at 184 and 186. Alternatively, the support hardware could prevent the host from reading the common memory to insure that no intermediate or final results of decryptions are available to the user.

A determination is made as to whether or not the encrypted file is complete as indicated at 188. This is needed in the event that the file is larger than the common memory. In the event the file is incomplete the program proceeds to 189 to request the next part of the file and then returns to 186. If the file is complete, the program proceeds to 190 to set the communication register to tell the support software on the host to load and run the unencrypted part of the application. The support hardware decrypts and begins execution of the software it has been passed as indicated at 200. The support software loads the unencrypted part of the application into the host computer's working memory and terminates its own execution by starting the execution of the unencrypted part of the application. It should be noted that the support software can terminate and remain resident in memory as an extension of the operating system services should its support be needed for further service calls to the support hardware. The portion of the application which has been decrypted in the support hardware's secure memory is run concurrently (in secure memory) with the portion of the application in the host's working memory. These parts may communicate through common memory and the port addressed registers. At completion of the application, the LDR function exits as indicated at 202. p If piracy is attempted by halting the execution of the program and attempting to make a loadable binary image of the host memory, the image will not be a usable version of the application because the portion of the software which executes on the support hardware will be unavailable.

The system has thus closed all avenues of access to the protected code except through use on a single machine. The use by the rightful owner, including the preparation of backup disks, is essentially unimpeded.

INDUSTRIAL APPLICABILITY

It is an object of the invention to provide an improved software copy protection mechanism.

It is another object of the invention to provide an improved software copy protection mechanism wherein a given piece of software is operable only on a single computing machine.

It is yet another object of the invention to provide an improved software copy protection mechanism wherein a given piece of software and any copies thereof are operable only on a single computing machine.

It is still another object of the invention to provide an improved software copy protection mechanism which restricts software distributed on disks, or other magnetic medium to use on a single computing machine; with the original disk being functionally uncopyable, until it is modified by the execution of a program stored in a tamper proof co-processor which forms part of the computing machine; with the modified software on the original disk being copyable, with the copy being operable only on the computing machine containing the coprocessor that performed the modification.

Having thus described our invention, what we claim as new, and desire to secure by Letters Patent is:

1. A software copy-protection apparatus, which is operable with a host computer system, comprising:
   a magnetic medium having tracks formed thereon which are divided into sectors, with each sector being comprised of a plurality of bit storage locations, with indicia being formed in at least one portion of at least one sector, with said indicia not being modifiable by the medium write process;
   a product program stored on said medium, at least a portion of which is in an encrypted form, and at least a portion of which may be in an unencrypted form;
   a support computing system operable with said host computer system, including a decryption key for use in executing said product programs on said host computer system;
   means for ascertaining said indicia are present on said medium;
   means included in said support computing system for utilizing said decryption key to decrypt said encrypted portion of said program; and
   means responsive to the ascertaining that said indicia is on said medium, and said encrypted portion of said program has been decrypted, to permit said support computing system to execute the encrypted portion of said program product and said host computer system to execute said unencrypted portion of said program product, if any.

2. The combination claimed in claim 1, including means for modifying the information on said medium by said host computer system to identify said program for use on said system.

3. The combination claimed in claim 2, including means for utilizing the modified information to prohibit the use of the program on said medium on any other computing system.

4. In a computing system, the combination comprising:
   a host computer connected to a host system bus;
   an interface system connected to said host system bus;
   a support computer connected to a support system bus, which support system bus is connected to said interface system, with at least a portion of said support computer being logically inaccessible to said host computer with said support computer system having stored therein a first decryption key for use in decrypting programs which may be run on said computing system;
   an original magnetic medium having tracks formed thereon which are divided into sectors, with each sector being comprised of a plurality of bit storage locations, with indicia in at least one bit storage location of at least one sector of at least one track that are not modifiable by the medium write process, with magnetic domain pattern marks overlapping said indicia, with said domain pattern marks not being createable by the medium write process;
   information stored on said magnetic medium which includes a second encrypted decryption key which can be decrypted with said first decryption key, an encrypted part of a program which can be decrypted with said second decryption key, possibly an unencrypted part of said program, and an encrypted description of said indicia and said magnetic domain marks, which can be decrypted with said second decryption key;

means for determining first use of said medium by ascertaining the presence of said indicia and said domain pattern marks on said medium, with said magnetic domain pattern mark being destroyed by the determination, whereby said medium is made inoperable on a different computing system;

means included in said support computer for utilizing said first decryption key to decrypt said second decryption key;

means responsive to the decryption of said second decryption key to decrypt the encrypted description of said indicia and said magnetic domain pattern marks;

means for comparing the decrypted indicia and magnetic domain pattern marks with the actual indicia and the actual magnetic domain pattern marks to ascertain the authenticity of said magnetic medium;

means responsive to said magnetic medium being identified as authentic for storing said decrypted second key in said support computer, including means for storing an identifier on said magnetic medium which identifies the storage location in said support computer where said encrypted second key is stored;

means responsive to determining the existence of said identifier on said medium, including means to locate the storage location of the decrypted second key in said support computer;

means for retrieving said decrypted second key from the storage location in said support computer and for using said key to decrypt and run the encrypted portions of said program on said support computer; and means for running the unencrypted portions, if any, of said program on said host computer.

5. In a computing system, the combination comprising:

a host computer system connected to a host computer bus;

a processor connected to a support computer bus, which communicates with said host computing system, and which executes a particular set of instructions, with the execution and results of predetermined ones of said particular set of instructions being inaccessible to said host computer system;

a read-only memory, connected to said support computer bus, addressable by said processor, and 13 not addressable by said host computer system, wherein said read-only memory includes data representing a private decryption key, which is to be used in conjunction with a particular public-key encryption/decryption algorithm; a first read-write memory, connected to said support computer bus, addressable by said processor, and not addressable by said host computer system;

a second read-write memory, connected to each of said host computer bus and said support computer bus, addressable by each of said processor and said host computer system;

a set of communicating registers, connected to each of said host computer bus and said support computer bus, addressable by each of said processor and said host computer system for transferring data between each other; and a set of bus receivers, connected from said host computer bus to said support computer bus, which enable the state of said host system bus to be monitored from said support computer bus.

6. The combination claimed in claim 5, wherein said processor includes means for examining the execution of instructions and the results of instruction execution by said host computer, utilizing said set of bus receivers.

7. The combination claimed in claim 6, wherein said processor, said read-only memory, said first and second read-write memories, said set of communicating registers and said set of bus receivers are physically enclosed in a tamper-proof package.

8. The combination claimed in claim 7, including:

an original magnetic medium having tracks formed thereon which are divided into sectors, with each sector being comprised of a plurality of bit storage locations, with doubly-marked regions comprised of a first mark comprised of indicia in at least one bit storage location of at least one sector of at least one track that are not modifiable by the medium write process, and a second mark comprised of magnetic domain pattern marks overlapping said indicia, with said magnetic domain pattern marks not being createable by the medium write process;

information stored on said magnetic medium including an encrypted decryption key and encrypted mark descriptors, and further including an application program, at least a portion of which is encrypted;

means for reading said encrypted decryption key into said first read-write memory; means for utilizing said private decryption key stored in said read-only memory and said encrypted decryption key stored in said first read-write memory to decrypt said encrypted decryption key, and storing the decrypted key in said first read-write memory;

means for reading said encrypted mark descriptors from said magnetic medium and storing same in said first read-write memory;

means for utilizing said decrypted key stored in said first-read write memory to decrypt the encrypted descriptors stored in said first read-write memory, including means for storing the decrypted descriptors back in said first read-write memory;

means for one of detecting the existence of, and measuring the properties of, said doubly marked regions on said magnetic medium to produce mark descriptors, including means for storing said mark descriptors in said first read-write memory;

means for producing a first comparison by comparing said decrypted descriptors with said mark descriptors;

means responsive to the first comparison to indicate one of said magnetic medium is a copy if there is no comparison, and indicating said magnetic medium is an original if there is a comparison;

a portion of said first read-write memory which is persistent, in the sense that information written into said persistent portion is retained when electrical power is not supplied to said persistent portion;

means responsive to the determination that there is a comparison, for storing said decrypted key in the persistent portion of said first read-write memory, and writing said original magnetic medium with the address where said decrypted key is stored in said first read-write memory.

* * * * *